(12) United States Patent
Chafe

(10) Patent No.: US 6,801,939 B1
(45) Date of Patent: Oct. 5, 2004

(54) METHOD FOR EVALUATING QUALITY OF SERVICE OF A DIGITAL NETWORK CONNECTION

(75) Inventor: Christopher D. Chafe, Palo Alto, CA (US)

(73) Assignee: Board of Trustees of the Leland Stanford Junior University, Stanford, CA (US)

( * ) Notice: Subject to any disclaimer, the term of this patent is extended or adjusted under 35 U.S.C. 154(b) by 702 days.

(21) Appl. No.: 09/686,320

(22) Filed: Oct. 10, 2000

Related U.S. Application Data

(60) Provisional application No. 60/158,521, filed on Oct. 8, 1999.

(51) Int. Cl.[7] .............................................. G06F 15/173
(52) U.S. Cl. ........................ 709/224; 709/218; 370/252
(58) Field of Search ................................ 709/223, 224, 709/227, 231, 218; 370/230, 248, 249, 252, 401; 725/93, 126; 379/52; 340/384

(56) References Cited

U.S. PATENT DOCUMENTS

| | | | | |
|---|---|---|---|---|
| 5,122,800 | A | | 6/1992 | Philipp ........................ 341/156 |
| 5,586,054 | A | | 12/1996 | Jensen et al. ............ 364/514 B |
| 5,694,548 | A | * | 12/1997 | Baugher et al. ............. 709/227 |
| 5,712,982 | A | | 1/1998 | Marcel ................... 395/200.17 |
| 6,078,953 | A | * | 6/2000 | Vaid et al. ................... 709/223 |
| 6,414,960 | B1 | * | 7/2002 | Kuhn et al. ............. 370/395.64 |
| 6,466,548 | B1 | * | 10/2002 | Fitzgerald ................... 370/249 |
| 6,487,196 | B1 | * | 11/2002 | Verthein et al. ............. 370/352 |
| 6,526,523 | B1 | * | 2/2003 | Chen et al. ..................... 714/38 |
| 6,553,410 | B2 | * | 4/2003 | Kikinis ........................ 709/218 |
| 6,574,216 | B1 | * | 6/2003 | Farris et al. ................. 370/352 |
| 6,578,077 | B1 | * | 6/2003 | Rakoshitz et al. ........... 709/224 |
| 6,580,694 | B1 | * | 6/2003 | Baker ......................... 370/252 |

OTHER PUBLICATIONS

Shenker, S. et al., "IEFT RFC 2212: Specification of Guarantee Quality of Service", Sep. 1997, pp 1–19.*

* cited by examiner

Primary Examiner—William A. Cuchlinski, Jr.
Assistant Examiner—Lambert Tran
(74) Attorney, Agent, or Firm—Lumen Intellectual Property Services, Inc.

(57) ABSTRACT

A technique for measuring, evaluating, and presenting virtual network connection latency and virtual network connection stability information allows users to easily evaluate the quality of internet connections in real time. The technique uses audible sounds to represent the round trip time (RTT) of an end-to-end network path as well as other connection qualities. This can be either by sounding tones that depend on momentary measurements obtained by "pinging" a remote host, or by driving the internet connection as the delay loop of a musical tone synthesis process. The synthesized tone is presented to a user in an audio, tactile, and/or visual manner. In a preferred embodiment, the synthesized tone is played to the user. Because the internet connection delay is used in the tone synthesis process, the pitch of the synthesized tone is a direct indicator of the real-time network connection latency. Changes in pitch indicate changes in connection latency.

17 Claims, 1 Drawing Sheet

US 6,801,939 B1

METHOD FOR EVALUATING QUALITY OF SERVICE OF A DIGITAL NETWORK CONNECTION

RELATED APPLICATION

This application claims the benefit of U.S. Provisional Application 60/158,521 filed Oct. 8, 1999, which is hereby incorporated by reference.

FIELD OF THE INVENTION

The present invention relates to techniques for evaluating the quality of internet connections. More specifically, the invention relates to methods for determining in real time the current time lag and stability of computer network connections.

BACKGROUND OF THE INVENTION

Internet communication protocols allow information to be transferred between two computers or devices on a network. Typically, the information follows a path through the network, passing through a number of intermediate routers. Although the hardware of the network may be operating flawlessly, there still may be delays in the virtual network connection. The stability and throughput of the virtual connection depends on the complexity of the path, the speed of the routers, network traffic, and other factors that vary with time and are generally unpredictable. Many types of network data, such as e-mail messages, are not sensitive to the stability and throughput of the network connection. If a message, or part of a message, is delayed by a few seconds or minutes, it has little consequence. Corrupted data can be retransmitted or reconstructed by the communication protocol or application. Some other types of network data, however, are more sensitive to the stability and throughput of a network connection. For example, if real-time audio or video data streams are transmitted over an unsuitably unstable or slow network connection, the audio or video will be repeatedly interrupted as it is played to a user. The user then must wait for data to be received and buffered before the audio or video continues playing. These disruptions are intolerable for many live audio or video transmissions. Moreover, even small latencies in the network connection can be intolerable for certain applications, particularly interactive ones, such as live musical performances involving musicians at separate network locations. Many other applications such as real-time remote control, internet games, and high-quality internet teleconferencing and internet telephony also depend on a reliable and regular relay of information with nearly ideal real-time throughput.

Although various techniques exist in the prior art for testing the hardware of a network, few techniques exist for testing or evaluating the virtual connection between computers on a network. One known technique for testing the hardware of a network is termed time domain reflectometry or time delay reflectometry (TDR). The TDR technique involves generating a pulse at one end of a physical transmission line in the network hardware, e.g., a coaxial cable. The delay and the strength of the reflected signal are measured to determine the quality of the transmission line. It is known to use electromagnetic pulses whose center frequency takes on a selected value that is either high frequency or low frequency or DC, thereby enabling one to test the transmission characteristics at various different frequencies. It is also known to take the fast Fourier transform (FFT) of the return pulse to determine the frequency response of the physical transmission line. The delay is then used to ascertain the physical location of a fault in the transmission line. See for instance U.S. Pat. Nos. 5,122,800, 5,586,054 and 5,712,982.

In a similar technique known in the art, a device that uses TDR to test LAN connections has sound output in the form of a buzzer that beeps or continuously sounds if the quality of the physical connection is below a minimum threshold.

In another technique known in the art, a multifrequency test signal is fed into a network and measured at another end of the network. The measured signal is then compared with an undistorted copy of the original test signal to determine the physical transmission properties of the network over a range of frequencies. A difference signal is calculated as a measure of the distortion.

It is important to recognize that the above techniques are useful only for testing the hardware of a computer network. They cannot be used to test the characteristics or qualities of virtual network connections, which depend not only on the physical properties of the physical transmission lines of the network, but also on the traffic load, router speed, and other virtual properties of the network not directly related to the hardware.

One known technique for testing a virtual network connection is a packet internet grouper (PING) tool, a part of the Internet Control Message Protocol (ICMP) and commonly available on machines running operating systems such as Unix, DOS, and MacOS. The PING tool is a very simple program that sends a small packet of information to another machine on the network, which then immediately sends a packet back to the original machine. The round-trip time (RTT) for the packet is then calculated and displayed to the user in the form of a number, or a list of symbols whose length is proportional to the round-trip time. The PING tool, however, provides only a momentary measurement of the virtual network connection latency and does not allow continuous monitoring of the connection. The PING tool does not provide any way to conveniently measure an aspect of stability of a network connection crucial to interactive flows, i.e., the changes in latency with time which are known to those skilled in the art as short-term jitter.

SUMMARY OF THE INVENTION

The present invention provides an improved technique for measuring, evaluating, and presenting virtual network connection latency information. In addition, the present invention provides a technique for measuring, evaluating, and presenting virtual network connection stability information. This technique allows users to easily evaluate the quality of internet connections by using the internet connection for audible tone synthesis, then presenting the synthesized tone to a user. Connections are taken to include those provided by "connection-oriented" and "connectionless" protocols, e.g., the Transmission Control Protocol (TCP) and the User Datagram Protocol (UDP), respectively.

In one aspect of the present invention, a new technique is provided for evaluating quality of service (QoS) of a network connection in an advanced digital network. In a typical implementation, the invention is embodied as a network software layer, which provides a user with an audible information about a qualitative measurement of transaction delay and delay constancy. The technique is especially useful for managing connections used in near-real-time, media-rich applications enabled by fast networking.

Existing techniques simply "ping" a connection and then print delay statistics or display an average data transfer rate. Users' capabilities to recognize information on the audio level is utilized in the present invention by audibly providing a synthesized tone in an altering quality. For example, information about varying RTT may be provided by controlling the pitch of the synchronized tone. The present method includes, in addition a novel technique to provide a continuous and very sensitive measure of the connection latency. Specifically, the present technique uses the virtual network connection to implement a tone synthesis loop, then drives this synthesis loop to produce synthesized tones. In the preferred embodiment of the invention the synthesized tone is a musical tone, which is less straining to hear for an extended period. Hence, the virtual network connection, may be correspondingly presented on the audio level as a string of a musical instrument. Just as the pitch of the sound produced by the instrument depends on physical properties of the string, the tone produced by the network connection implemented synthesis loop depends on the delays present in the network connection. The pitch of the synthesized tone thus provides a continuous measure of the network latency. Moreover, the stability of the pitch provides a measure of the stability of the connection. The sound is created by continuously reflecting a test signal between two network terminals, e.g., between a client machine and a server machine. Recognizing the inherent network delays between these reflections and correlating the delay periods to the frequency of the synthesized tone allows the pitch of the sound to represent transmission latency and the pitch stability to represent the regularity of the network service.

In contrast with the prior art techniques that use a single pulse to determine an instantaneous connection delay, the present technique continuously drives the connection to provide continual monitoring of the connection characteristics. Moreover, the present invention permits the novel presentation of the connection latency to the user in terms of an audible tone whose pitch immediately communicates to the user the connection latency and stability while allowing the user to simultaneously interact with the computer on the visual level and perform tasks other than observing the connection characteristic.

Because humans have a highly accurate sense of pitch, the present technique precisely and directly communicates to the user very subtle features of the network connection. The technique is especially useful as a diagnostic for real-time media applications such as high-quality teleconferencing or teleoperations which are being enabled by Internet2 and higher-speed network systems, including schemes for enhanced QoS through priority queuing of specific traffic.

A preferred embodiment of the technique involves sending a digital audio data stream continuously from a first computer across the internet to a second computer, then back to the first computer, and then using the recirculating connection loop as a delay line to synthesize an audible tone, in analogy to musical tone synthesis techniques based on physical models. Musical instruments like strings are mechanical systems comprising a tunable audio-rate sound transmission delay, typically on the order of 0.5–50 ms. Surprisingly, the present inventor has discovered that these delays are also typical of network connection delays. Thus, a musical tone may be synthesized using the internet connection itself as the transmission delay. Just as changing characteristics of an instruments string changes the sound produced, so changes in the network connection changes the synthesized sound. The present invention, in other words, allows a user to directly listen to the "sound" of the network (as if it were a vibrating acoustic medium). The sound "played" by the network communicates directly and intuitively to the user the characteristics of the network connection. The present invention, therefore, provides a simple and intuitive technique for evaluating the time lag and stability of a network connection.

In addition, the invention may be employed to rapidly detect the formation and/or location of so called congestion points in a complex path. As is known to those skilled in the art, a congestion point may for instance be a congestion in an intermediate router reducing the total throughput of a connection. In such a case, the evaluation method of the present invention can be put into a chord mode in which chord tones are created as a result of reflections in all intermediate routers. On the near side of the congestion points, chord tones will remain appropriate, those beyond will be changed. The chord tones are simultaneously provided to the user who may experience them as a uniquely distinguishable sound. The human's hearing capabilities allow the acoustic recognition of very slight sound variations making a relatively high information resolution of the network connection feasible compared to visual and/or contextual information presentation.

In a preferred implementation of the present invention, one computer runs a synthesis model program that streams a test signal over the network to another computer, which then reflects the signal back to the model. The synthesis model in turn reflects the signal, filters it, and sends it again over the network connection to the other computer. Excitations of the model will recirculate on the net, just as an excitation of a string propagates down the length of the string and is reflected at the end of the string and propagates back and forth until it decays to silence. The result is a synthesized tone whose frequency or pitch is determined by the delay between the two ends of the network connection. As a variation, the synthesis model may continue to excite the loop, just as a violin bow continues to excite the string of a violin while it is being played. In either version, the synthesis model plays a synthesized tone to a user. If the delay is within the audio range is completely stable, the user hears a stable, pure pitch. If the delay increases, the user hears the pitch drop, just as the pitch of a violin drops as the musician's finger moves up the neck of the instrument, increasing the effective length of the string. If the network connection delay is unstable, the user hears a wavering pitch. Because network connection delays can change in a discontinuous manner, the present invention preferably includes a small buffer that is used to implement an interpolation that creates smooth transitions between such discontinuous changes. As a result, the user hears a sudden but smooth change in pitch rather than an instantaneous break up of the sound.

DETAILED DESCRIPTION OF A PREFERRED EMBODIMENT

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
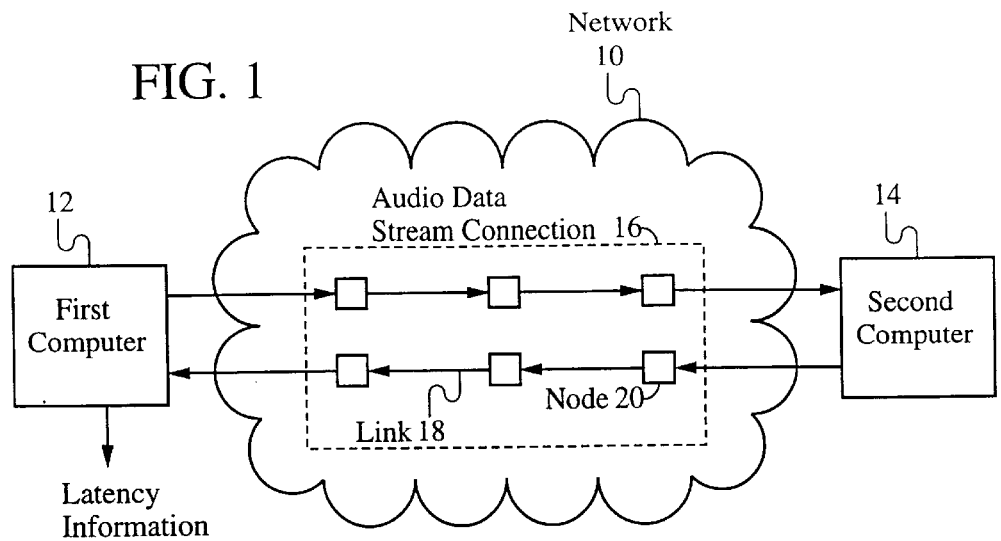
FIG. 1 illustrates a system used to implement the techniques of a preferred embodiment of the present invention.

A preferred embodiment of the present invention will now be described with reference to FIG. 1. The invention provides a useful tool for measuring quality of service (QoS) for near-real-time interactive flows across the Internet Network 10 between a first computer 12 and a second computer 14. The next generation of networking will make commonplace reserved bandwidth and low-latency transactions. The method of the present invention provides efficient means to assess QoS provisions and reliability of full-duplex interactive network connections. The method is preferably implemented as network software layers in the two network computers 12 and 14, and provides an intuitive way of qualitatively evaluating transaction delay and delay constancy between the computers. The technique is directly applicable to interactive audio, music and video communication needs and, more generally, to users of any interactive real-time applications over high-speed networks.

One of the network computers 12 is preferably provided with a software application or networking utility program. The first computer 12 is connected to the second computer 14 via a virtual network connection referred to in FIG. 1 as Audio Data Stream Connection 16 including a series of connection links 18 and nodes 20. The user who needs to test the connection to the second computer 14 can click on a testing button or otherwise issue a command that activates the application. Using the network connection as a delay loop, the software opens a digital audio data stream connection to the second computer 14 and sends digital test signals over the connection. These test signals may include in the preferred embodiment excitation signals that simulate plucking an instrument string, as well as signals already propagating over the connection. The excitation signals are either momentarily or continuously injected into the network connection, and propagate through the connection to the second computer 14. The second computer 14 is provided with application or network software that receives these test signals and reflects them back to the first computer 12. This software supports a network socket connection that can stream in and out audio samples, simulating the reflection of the test signals. The first computer 12 receives these reflected signals, and processes and outputs them as an audio tone that is played to the user in real time, for instance, via a conventional speaker. The processing may be performed in a fashion well known to those skilled in the art, for instance, by adding the individually received reflections and/or by taking the time information of the reflection as a parameter to control an independent sound synthesizer.

In the case where the test signal is an acoustic signal, a lowpass filter may be implemented at one or both of the computers 12, 14 to simulate the attenuation and dispersion of the excitation signal while propagating through the loop and being reflected. Because the inherent network delay between the computers is used as the tone synthesis loop, the pitch of the synthesized sound represents the transmission latency. In addition, the tone's stability represents the regularity of the network connection. The ear's ability to discern minute differences makes this technique an unforgiving, fine-grained and precise test of network reliability. Because the acoustic signal is simple, the bandwidth requirements of the technique are inherently low (i.e., less than 1 Mbit/s). The invention thus provides a non-invasive method for measuring quality of service that can be innocuously embedded without increasing load. The technique is intended to supplement rather than replace quantitative measurements such as bidirectional metering conforming to the protocol developed by the Internet Engineering Task Force's (IETF) Realtime Traffic Flow Measurement (RTFM) Working Group.

The software at the two computers is designed to support audio reflections streaming between sockets, which are tapped to a sound output at one (or both) of the computers. There are two parts to the software: a physical model of the musical instrument and an audio streaming, socket-based delay component. Any physical model which incorporates a "lumped circuit" topology is appropriate. Strings, winds and many percussion instruments lend themselves to this type of simulation. The acoustic waveguide (string, bore, mallet block, etc.) is represented by a pure delay line combined with a filter which "lumps" together spectral modifications, attenuation, and any passive non-linear aspects of the waveguide. The filter can be implemented at one or both of the computers.

The first computer 12 initiates the tone and the sound is reflected back by the second computer 14 as if it were the terminating end of the string or bore of a musical instrument. Although physical model musical tone synthesis is well known, it has always been implemented in a single computer for musical purposes. The prior art does not teach or suggest a distributed implementation of such tone synthesis techniques, an implementation of tone synthesis using a digital audio data stream over a network as the delay loop, or the use of tones synthesized over a network to measure attributes of a network connection.

In other words, for a digital transmission of acoustic signals as test signals, the acoustic signal may be decoded in a fashion that corresponds to typical connection disturbances in digital networks and to the human's ability to recognize analog signal discrepancies rather than digital signal discrepancies. For instance, data may be lost during the test transmission, which would result in a partially erroneous decoding into the analog signal provided to the user in case a conventional coding and decoding algorithm would be used. Consequently the analog signal would have distortions like, for instance, sudden wave inconsistencies which may be experienced by the user as non conclusive noise or sound distortion. By utilizing a specific coding/decoding algorithm that takes into account the typical connection disturbances in digital networks, the analog signal may be presented to the user with analog alterations that correspond to the typical connection disturbances. The coding/decoding algorithm may automatically compose code sounds into the analog signal that correspond to recognized error patterns. Such a code sound may for instance be, a drum beat for a bit drop, or the sound of wind for continuous jitter. It is clear to one skilled in the art that the presented examples may be altered in any known way without diverting from the scope of the invention. In addition various time delays may be assigned to previously stored sounds rather than synthesizing the sounds directly from the test signal.

Figure 2:
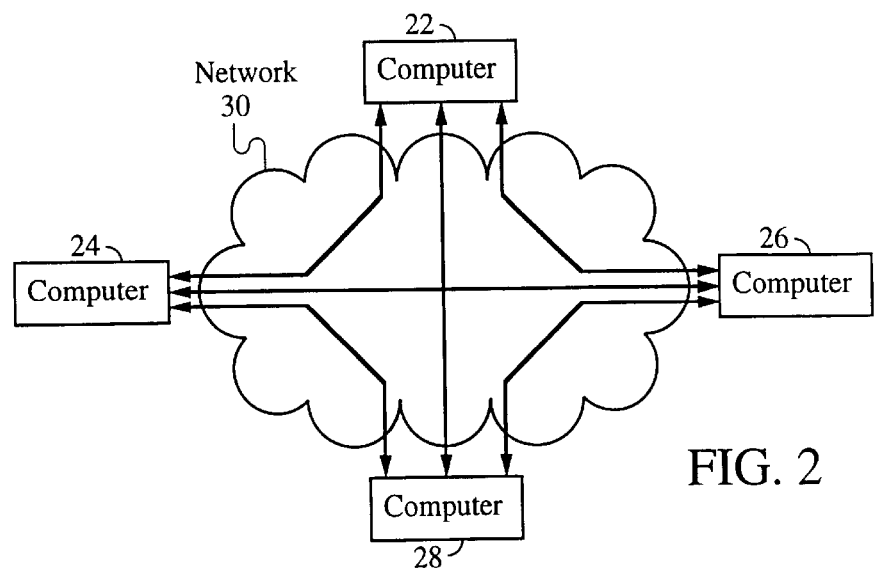
FIG. 2 illustrates a system used to implement an alternate embodiment of the present invention involving multiple network computers.

As illustrated in FIG. 2, the preferred embodiment of the technique supports multiple audio channels between a number of computers 22, 24, 26, and 28 communicating over a network 30. In the example shown in FIG. 2, each of the four computers has three audio channels simultaneously connecting it to the other three computers. Each connection operates in the same manner as the technique described in relation to FIG. 1 except that acoustic scattering junctions are employed at the nodes.

In its uncompressed form, the basic acoustic network channel between computers will be 705.6 kBit/s (16-bit linear sound samples clocked at the standard CD-audio rate of 44.1 kHz). Other resolutions are also suitable, e.g. 8 bit/8 kHz or 24 bit/96 kHz. Multiple parallel audio channels can be added to increase bandwidth loading and add musical polyphony or spatial possibilities (such as surround sound). Because compression schemes may add delay, the audio stream is preferably not compressed or, compressed using a very fast compression algorithm, A preferred embodiment of the invention includes a pitch-synchronous internal buffer whose contents are time-stretchable (through interpolation of sound samples). In the event that an incoming packet is delayed, the buffer permits smoother pitch changes as the round-trip delay falters. Running without this internal buffer, tones change more drastically than is considered musical. With the buffer, the tones can change very quickly without unpleasant discontinuities.

Delays on the order of 100 s of ms are commonplace, especially over WAN paths on current commodity networks. Delay times in excess of 50 ms create subsonic fundamental frequencies. For instance, 100 ms is a very low tone (with a 10 Hz pitch) which sounds like the plucking of very large cables (like those on a large suspension bridge). Surprisingly, pluck-type instruments do not actually sound bad in this range since a musical timbre results that is comprised of the tone's audible overtones (i.e., dozens of harmonics lying within the range of hearing). The same holds for other instruments that might be implemented. As the delays shorten, the fundamental will rise into more realistic pitch ranges.

Other network topologies and musical representations can be chosen. For example, a so-called traceroute is a network utility that lists all intermediate routers between two hosts. With this information, a version of the present invention could individually connect to each relay point along a network path at the same time and obtain a musical chord representing timing details of individual path segments. The chords' components would change in pitch as segments change within the entire path.

As another example, choice of mapping between RTT information and musical scale is up to the application designer. Western scales are typically with seven tones within the octave (the white notes of the piano), and the pentatonic scale is five within the octave (the black notes). RTT-dependent pitches can be quantized to any scale.

Another variation on the form of auditory feedback is to transform the RTT into timbre or another audio quality. Yet another possibility is to use a multi-speaker sound system and spatially distribute connections and network nodes according to their actual locations; hosts to the East sounding in the East, for example.

Additonal features which can supplement the core technology include a number of extensions to the user interface. For example, tactile audio feedback involves sending the audio signal to a haptic or force-feedback controller device in the hands of the user, e.g., a force-feedback computer mouse. Instead of, or in addition to hearing the synthesized tone representing the network connection, tactile audio feedback allows the user to feel the vibration of the synthesized tone (as well as the kinesthetics of the excitation signal) and this is especially useful for low-frequency pitches (below the 50 ms/20 Hz auditory cutoff).

Another alternate embodiment includes the choice of various timbres based on waveguides including percussion, woodwind instruments, simulations of instrument bodies, etc. A synthesized singing voice can also be implemented by using the glottis as the delay-based element and by mapping the particular vocalization to other QoS parameters. Another vocal synthesis model (related to the "FOF" technique) consists of triggering successive glottal impulses at the RTT rate. Returning impulses are summed into the tone as soon as they are reflected back.

Alternate embodiments can also include reverberation based on interconnections between multiple machines, as discussed above in relation to FIG. 2. Multiple connections provide an assortment of delay paths between a number of sites. By coupling the connections to each other, sound reverberations propagate through the various connections. By changing the absorption characteristics of such a reverberator, the circuit simulates a 2-D drum surface which is topologically like the reverberation case, but is now a connection mesh which can also be impulsively excited to sound like a drum, gong or cymbal stroke.

It will also be noted that the techniques of the invention can be used as the basis for a new form of musical instrument. The network synthesis loop or connection mesh creates a sounding object that bridges large physical distances. A synthesized stretched string or wind instrument bore can have terminations at locations far removed from each other, a drum can have many sides. Musicians can interact by playing on the instrument together from physically remote locations, e.g., a distributed drummer's circle The category of musical instruments that this leads to, in general, are those that are distributed across a network in such a manner that the network is used to interconnect algorithmic components ("unit generators" in the common Music V parlance) and/or is utilized itself as an algorithm component (e.g., for time delay or radiation). The technique can be thought of as a folding of a network (LAN or internet) into algorithms for sound synthesis.

The inventive method may be provided on individual computers as part of the operating system, within a web browser, as self extracting email attachment, or as an com puter executable code stored on a data storage medium known to those skilled in the art.

Accordingly, the scope of the invention described in the specification above is set forth by the following claims and their legal equivalent:

What is claimed is:

1. A method for real time monitoring of network connection latency, the method comprising:

a) establishing a network connection between a first computer and a second computer;

b) transmitting a data stream in a round trip between said first and second computers; and c) generating a sound having a variable pitch determined by a variable delay of said connection as experienced by said data stream.

2. The method of claim 1, wherein said data stream is a digital code of an audio excitation signal.

3. The method of claim 1, wherein said sound is transformed into a tactile signal.

4. The method of claim 1, wherein said transmitting a data stream comprises audio low-pass filtering.

5. The method of claim 1, wherein said generating a sound comprises synthesizing a tone with a physical model having said variable delay as an input.

6. The method of claim 1, wherein said sound comprises a tone.

7. The method of claim 1, wherein said data stream recirculates between said first and second computers over said network connection.

8. A method for real time monitoring of network connection latency, the method comprising:

a) establishing a network connection between a first computer and a second computer;

b) transmitting a digital audio data stream in a round trip between said first and second computers; and c) synthesizing a tone, wherein a variable pitch of the synthesized tone is determined by a variable delay of the digital audio data stream.

9. The method of claim 8 further comprising generating an audio signal from the synthesized tone.

10. The method of claim 8 further comprising generating a tactile signal from the synthesized tone.

11. The method of claim 8, wherein said transmitting further comprises low-pass filtering of said digital audio data stream.

12. The method of claim 8, wherein said synthesizing is performed with a physical model having said variable delay as an input.

13. The method of claim 8, wherein said digital audio data stream recirculates between said first and second computers over said network connection.

14. A method for generating a tone, the method comprising:
- a) establishing a network connection between a first computer and a second computer;
- b) transmitting a data stream in a round trip between said first and second computers; and
- c) synthesizing a tone, wherein a variable pitch of the synthesized tone is determined by a variable delay of said data stream connection.

15. The method of claim 14, wherein said synthesizing a tone is performed with a physical model having said variable delay as an input.

16. The method of claim 14, wherein said data stream comprises a digital audio data stream.

17. The method of claim 14, wherein said data stream recirculates between said first and second computers over said network connection.

* * * * *